(12) United States Patent
Kim et al.

(10) Patent No.: US 10,622,153 B2
(45) Date of Patent: Apr. 14, 2020

(54) MULTILAYER CAPACITOR

(71) Applicant: SAMSUNG ELECTRO-MECHANICS CO., LTD., Suwon-si, Gyeonggi-do (KR)

(72) Inventors: Hwi Dae Kim, Suwon-si (KR); Sang Soo Park, Suwon-si (KR); Young Ghyu Ahn, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/976,594

(22) Filed: May 10, 2018

(65) Prior Publication Data

US 2019/0172646 A1     Jun. 6, 2019

(30) Foreign Application Priority Data

Dec. 6, 2017     (KR) .................... 10-2017-0166501

(51) Int. Cl.
*H01G 4/30*     (2006.01)
*H01G 4/005*    (2006.01)
*H01G 4/12*     (2006.01)

(52) U.S. Cl.
CPC ............ *H01G 4/30* (2013.01); *H01G 4/005* (2013.01); *H01G 4/1245* (2013.01)

(58) Field of Classification Search
CPC ........ H01G 4/005; H01G 4/008; H01G 4/012; H01G 4/12; H01G 4/30; H01G 4/248; H01G 4/224; H01G 4/1227
See application file for complete search history.

(56) References Cited

U.S. PATENT DOCUMENTS

| | | | |
|---|---|---|---|
| 9,418,789 B2* | 8/2016 | Lee | H01G 4/30 |
| 2015/0170842 A1* | 6/2015 | An | H01G 4/30 361/321.2 |
| 2015/0318110 A1 | 11/2015 | Lee et al. | |
| 2016/0099107 A1* | 4/2016 | Lee | H01G 4/012 174/260 |
| 2016/0240310 A1* | 8/2016 | Kim | H01G 4/12 |
| 2017/0164466 A1* | 6/2017 | Park | H05K 1/181 |

FOREIGN PATENT DOCUMENTS

| KR | 10-2005-0071733 A1 | 7/2005 |
|---|---|---|
| KR | 10-2015-0125335 A | 11/2015 |
| KR | 10-1598297 B1 | 2/2016 |

* cited by examiner

*Primary Examiner* — Nguyen T Ha
(74) *Attorney, Agent, or Firm* — Morgan, Lewis & Bockius LLP (57) ABSTRACT

A multilayer capacitor includes a body including an active region including a plurality of first and second internal electrodes alternately disposed with respective dielectric layers interposed therebetween and upper and lower cover regions, and having first and second surfaces opposing each other and third and fourth surfaces opposing each other, the first and second internal electrodes being exposed to the third and fourth surfaces, respectively, first and second external electrodes disposed on the third and fourth surfaces, respectively, and connected to the first and second internal electrodes, respectively, and a plurality of dummy electrodes disposed in the lower cover region. A total thickness of the dummy electrodes disposed in the lower cover region is less than 20% of a sum of a thickness of the lower cover region and a thickness of one of the first and second external electrodes disposed on a mounting surface of the body.

8 Claims, 7 Drawing Sheets

MULTILAYER CAPACITOR

CROSS-REFERENCE TO RELATED APPLICATION

This application claims the benefit of priority to Korean Patent Application No. 10-2017-0166501 filed on Dec. 6, 2017 in the Korean Intellectual Property Office, the disclosure of which is incorporated herein by reference in its entirety.

BACKGROUND

1. Field

The present disclosure relates to a multilayer capacitor.

2. Description of Related Art

In accordance with the miniaturization of an electronic device, requirements for miniaturization and high capacitance of a passive element have increased.

Particularly, since in a recent electronic device, many components are mounted in a restrictive space, requirements for three-dimensionally decreasing a thickness of a chip in addition to securing a two-dimensional mounting area according to the related art have increased.

However, when a thickness of a multilayer capacitor is reduced, there may be problems in that capacitance may not be suitably implemented and mechanical rigidity may be deteriorated.

Further, when the number of stacked internal electrodes is insufficient, it may be difficult to implement high capacitance of the capacitor, and equivalent series resistance (ESR) may be increased.

In addition, when the number of stacked internal electrodes is insufficient, a contribution of capacitance of each of the internal electrode layers to forming overall capacitance is increased. Therefore, when even in only one layer, functions of an electrode are lost by warpage cracks or oxidation of an internal electrode, overall capacitance of the multilayer capacitor may be significantly decreased.

Therefore, in order to improve mechanical strength of a low-profile multilayer capacitor, a method of inserting a dummy electrode that does not electrically contribute to forming capacitance has been disclosed, but in this case, there is a problem in that equivalent series inductance (ESL) may be increased.

SUMMARY

An aspect of the present disclosure may provide a multilayer capacitor capable of significantly decreasing a degree of increase of ESL while securing a predetermined level or more of mechanical rigidity.

According to an aspect of the present disclosure, a multilayer capacitor may include a body including an active region including a plurality of dielectric layers and a plurality of first and second internal electrodes alternately disposed with respective dielectric layers interposed therebetween and upper and lower cover regions disposed on upper and lower portions of the active region, and having first and second surfaces opposing each other and third and fourth surfaces connected to the first and second surfaces and opposing each other, the first and second internal electrodes being exposed to the third and fourth surfaces of the body, respectively; first and second external electrodes disposed on the third and fourth surfaces of the body, respectively, and connected to the first and second internal electrodes, respectively; and a plurality of dummy electrodes disposed in the lower cover region, wherein a total thickness of the dummy electrodes disposed in the lower cover region is less than 20% of a sum of a thickness of the lower cover region and a thickness of one of the first and second external electrodes disposed on a mounting surface of the body.

The dummy electrode may be an electrode disposed in the same direction as an internal electrode disposed in a lower portion of the active region.

The dummy electrode may be a floating electrode.

The dummy electrode may include a floating electrode and first and second dummy patterns formed to be spaced apart from each other on a dielectric layer on which the floating electrode is formed and connected to the first and second external electrodes, respectively.

The multilayer capacitor may further include a plurality of dummy electrodes disposed in the upper cover region, wherein a total thickness of the dummy electrodes disposed in the upper cover region is less than 20% of a sum of a thickness of the upper cover region and a thickness of one of the first and second external electrodes disposed on a surface of the body opposing the mounting surface of the body.

The dummy electrode may be an electrode disposed in the same direction as an internal electrode disposed in an upper end of the active region.

The dummy electrode may be a floating electrode.

The dummy electrode may include a floating electrode and first and second dummy patterns formed to be spaced apart from each other on a dielectric layer on which the floating electrode is formed and connected to the first and second external electrodes, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
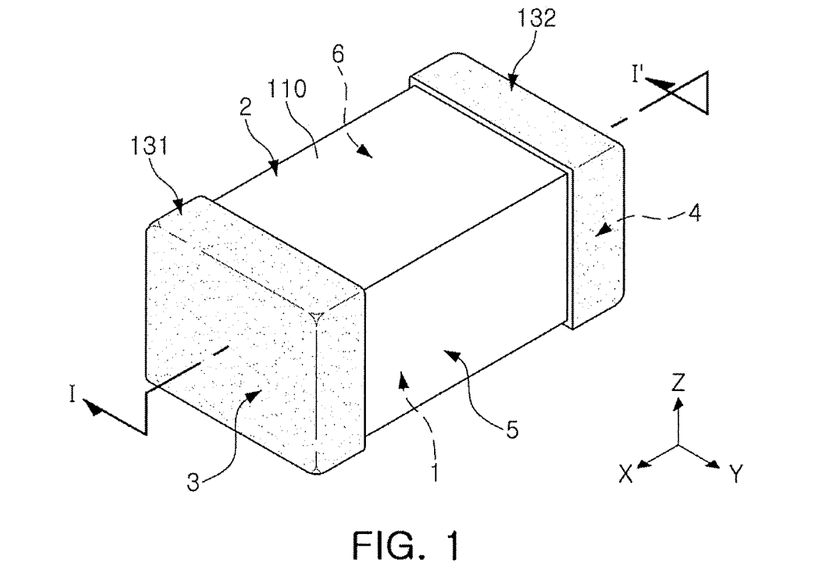
FIG. 1 is a perspective view illustrating schematic structure of a multilayer capacitor 100 according to an exemplary embodiment in the present disclosure.
Figure 2:
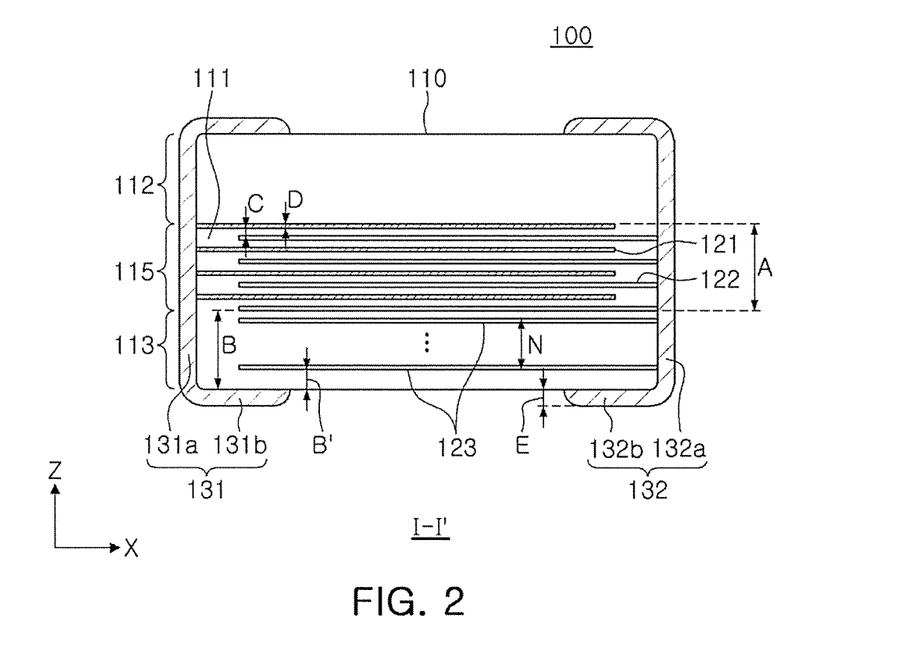
FIG. 2 is a cross-sectional view of the embodiment of FIG. 1 taken along line I-I' of FIG. 1.

FIG. 1 is a perspective view illustrating schematic structure of a multilayer capacitor 100 according to an exemplary embodiment in the present disclosure, FIG. 2 is a cross-sectional diagram taken along line I-I' of FIG. 1, and FIGS. 3A through 3C are plan views illustrating structures of first and second internal electrodes 121 and 122 and a dummy electrode 123 of FIG. 1, respectively.

Directions of a body 110 will be defined in order to clearly describe exemplary embodiments in the present disclosure. X, Y, and Z illustrated in the accompanying drawings refer to a length direction, a width direction, and a thickness direction of the body 110, respectively. Here, the thickness direction may be the same as a stacking direction in which dielectric layers 111 are stacked.

Figure 3A:
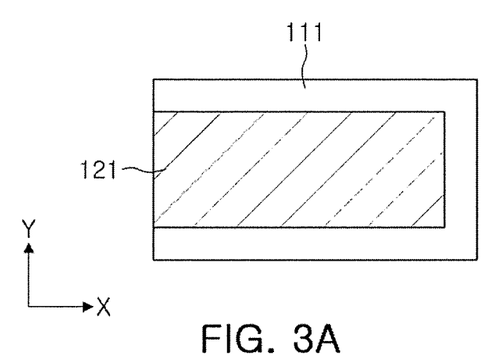
FIGS. 3A through 3C are plan views of the embodiment of FIG. 1 illustrating structures of first and second internal electrodes 121 and 122 and a dummy electrode 123 of FIG. 1, respectively.
Figure 3B:
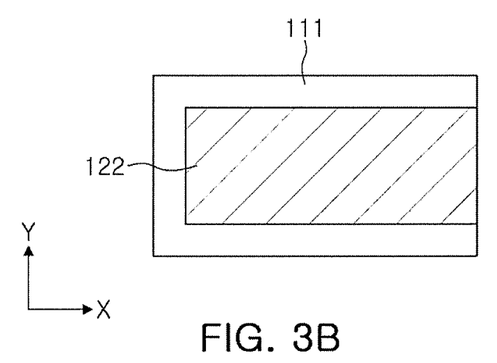
Figure 3C:
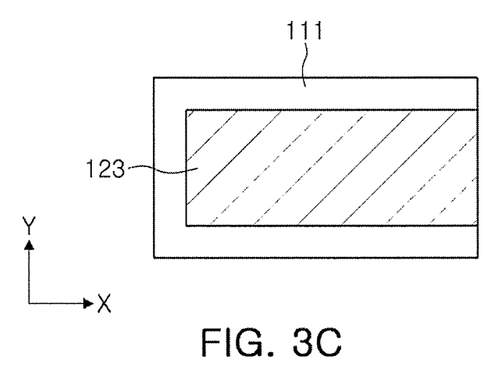

Referring to FIGS. 1 through 3, the multilayer capacitor 100 according to the present disclosure may include the body 110, first and second external electrodes 131 and 132, and a plurality of dummy electrodes 123.

The body 110 may be formed by stacking a plurality of dielectric layers 111 in the Z direction and then sintering the stacked dielectric layers 111, and include an active region 115 and cover regions 112 and 113 disposed on upper and lower portions of the active region 115 in the Z direction, respectively.

The active region 115 may include the plurality of dielectric layers 111 and a plurality of first and second internal electrodes 121 and 122 alternately disposed with each of the dielectric layers 111 interposed therebetween in the Z direction.

In this case, the respective adjacent dielectric layers 111 of the body 110 may be integrated with each other so that boundaries therebetween are not readily apparent.

The body 110 as described above may generally have a hexahedral shape. However, a shape of the body 110 is not limited thereto.

In the present exemplary embodiment, for convenience of explanation, both surfaces of the body 110 opposing each other in the Z direction will be defined as first and second surfaces 1 and 2 or top and bottom surfaces, respectively, both surfaces of the body 110 connected to the first and second surfaces 1 and 2 and opposing each other in the X direction will be defined as third and fourth surfaces 3 and 4 or end surfaces of the body 110, and both surfaces of the body 110 connected to the first and second surfaces 1 and 2 and the third and fourth surfaces 3 and 4 and opposing each other in the Y direction will be defined as fifth and sixth surfaces 5 and 6 or side surfaces of the body 110.

In the present exemplary embodiment, the first surface 1 corresponding to a lower surface or bottom surface of the body 110 which may be a surface facing a printed circuit board's surface mounted with the multilayer capacitor 100.

Further, the cover regions 112 and 113 may be formed by stacking one or more dielectric layers 111 on the upper and lower portions of the active region 115 in the Z direction, respectively.

In addition, the dielectric layer 111 may contain a ceramic material having high permittivity such as $BaTiO_3$ based ceramic powder, or the like. However, the material of the dielectric layer 111 is not limited thereto.

The $BaTiO_3$ based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, and the like, are partially solid-dissolved in $BaTiO_3$, or the like, but an example of the $BaTiO_3$ based ceramic powder is not limited thereto.

Further, a ceramic additive, an organic solvent, a plasticizer, a binder, a dispersant, and the like, may be further added to the dielectric layer 111 together with the ceramic powder.

As the ceramic additive, for example, a transition metal oxide or carbide, rare earth elements, magnesium (Mg), aluminum (Al), or the like, may be used.

The first and second internal electrodes 121 and 122, which are electrodes having different polarities from each other, may be exposed to the third and fourth surfaces 3 and 4 of the body 110.

In this case, the first and second internal electrodes 121 and 122 may be electrically insulated from each other by the dielectric layer 111 disposed therebetween.

In addition, end portions of the first and second internal electrodes 121 and 122 alternately exposed to the third and fourth surfaces 3 and 4 of the body 110 may be electrically connected to the first and second external electrodes 131 and 132, respectively.

In this case, the first and second internal electrodes 121 and 122 may be formed of a conductive metal, for example, nickel (Ni), a nickel (Ni) alloy, or the like. However, a material of the first and second internal electrodes 121 and 122 is not limited thereto.

Through the above-mentioned configuration, when a predetermined voltage is applied to the first and second external electrodes 131 and 132, electric charges may be accumulated between the first and second internal electrodes 121 and 122 facing each other.

In this case, capacitance of the multilayer capacitor 100 may be in proportion to an area of overlap between the first and second internal electrodes 121 and 122 overlapping each other in the Z direction.

The first external electrode 131 may be disposed on the third surface 3 of the body 110, and the second external electrode 132 may be disposed on the fourth surface 4 of the body 110.

Voltages having different polarities may be provided to the first and second external electrodes 131 and 132, and the external electrodes 131 and 132 may be electrically connected to exposed portions of the first and second internal electrodes 121 and 122, respectively.

The first and second external electrodes 131 and 132 as described above may respectively include first and second connection portions 131a and 132a disposed on the third and fourth surfaces 3 and 4 of the body 110, respectively, to thereby be connected to the first and second internal electrodes 121 and 122, respectively. Also, first and second band portions 131b and 132b of the first and second external electrodes 131 and 132 are extended from the first and second connection portions 131a and 132a to portions of the first and second surfaces 1 and 2 of the body 110, respectively.

Here, the first and second band portions 131b and 132b may be extended to portions of the fifth and sixth surfaces 5 and 6 of the body 110, respectively.

In addition, if necessary, plating layers (not shown) may be formed on surfaces of the first and second external electrodes 131 and 132.

For example, the first and second external electrodes 131 and 132 may include first and second conductive layers (not shown), first and second nickel (Ni) plating layers formed on the first and second conductive layers, and first and second tin (Sn) plating layers formed on the first and second nickel (Ni) plating layers, respectively.

In the present exemplary embodiment, the plurality of dummy electrodes 123 may be disposed in a lower cover region 113.

The dummy electrode 123 may be formed of a conductive paste containing a conductive metal.

Here, the conductive metal may be Ni, Cu, Pd, or an alloy thereof, but is not limited thereto.

In the present exemplary embodiment, the dummy electrode 123 may be an electrode disposed in the same direction as an internal electrode 121 or 122 and disposed in a lower portion of the active region 115, that is, the dummy electrodes 123 may be the second internal electrodes 122 based on the accompanying drawings.

Therefore, the dummy electrode 123 may be exposed to the fourth surface 4 of the body 110, which is the same surface as the surface to which the second internal electrode 122 disposed in the lower portion of the active region 115 is exposed, such that the dummy electrode 123 may be connected to the second connection portion 132a of the second external electrode 132.

When the dummy electrode 123 is the electrode disposed in the same direction as the internal electrode disposed in the lower portion of the active region 115 as described above, rigidity of the multilayer capacitor 100 may be increased, and oxidation of the internal electrode 121 or 122 may be prevented.

Further, when the dummy electrode 123 is the electrode disposed in the same direction as the internal electrode 121 or 122 disposed in the lower portion of the active region 115, contact failure of a product in which the number of stacked layers is small may be decreased, and a fine control for achieving target capacitance may be easily performed.

When a dummy electrode 123 is inserted into a body 110, a metal ratio in the body 110 may be increased, such that mechanical strength may be improved and a crack occurrence frequency may be decreased.

However, when the dummy electrode 123 is inserted, a portion of a magnetic material in a current loop forming inductance may be increased, such that equivalent series inductance (ESL) may be increased directly after a resonance point, and a secondary peak may be generated, such that total ESL may be increased.

Therefore, in order to simultaneously secure mechanical rigidity and electrical performance of the multilayer capacitor, there is a need to insert the dummy electrode 123 so as to allow a degree of increase of ESL to be significantly decreased while suppressing cracks from occurring by increasing a portion of a metal.

A current loop electrically connected to an internal electrode 121 or 122 tends to form a shortest path in accordance with an increase in frequency. Therefore, finally, a current loop is formed by an internal electrode 121 or 122 adjacent to a lower cover region 113, an external electrode 131 or 132, and a board may become a main component forming ESL.

In the present exemplary embodiment, a total thickness of the dummy electrodes 123 disposed in the lower cover region 113 may be controlled to be less than 20% of a sum of a thickness B of the lower cover region 113 and a thickness of the external electrode 131 or 132 disposed on the first surface 1 or bottom surface of the body 110 corresponding to a mounting surface of the body 110.

Therefore, a degree of increase of ESL may be less than 10%, and mechanical defects such as warpage cracks of the multilayer capacitor may be decreased.

The total number of stacked dummy electrode 123 to which the present numerical limit may be applied may be limited by the following Equation 1.

$$N < \frac{0.2*(B+E)}{(C+D)} \qquad \text{[Equation 1]}$$

Here, N is the total number of dummy electrodes 123, B is the thickness of the lower cover region 113, C is a thickness of the dielectric layer 111, D is a thickness of the internal electrode 121 or 122 and the dummy electrode 123, and E is the thickness of the external electrode 131 or 132.

The following Table 1 illustrates results obtained by applying Equation 1 depending on parameters illustrated in FIG. 2 based on a multilayer capacitor 100 having a 0603 size.

Here, in samples 1, 6, and 11, there was no dummy electrode 123, in samples 2, 7, and 12, the number of dummy electrode 123 was 1, samples 3, 8, and 13, the number of dummy electrodes 123 was 2, samples 4, 9, and 14, the number of dummy electrodes 123 was 3, and in samples 5, 10, and 15, the number of dummy electrodes 123 was 4.

TABLE 1

| Thickness (μm) of Lower Cover Region (B) | Sample # | Thickness (μm) of Dielectric Layer C | Thickness (μm) of Electrode D | Thickness (μm) of External Electrode E | Numbers of Dummy Electrode N | Ratio (%) | $N < \frac{0.2*(B+E)}{(C+D)}$ |
|---|---|---|---|---|---|---|---|
| 51.25 | 1 | 2.5 | 2.5 | 20 | 0 | 0.00 | 2.85 |
|  | 2 | 2.5 | 2.5 | 20 | 1 | 7.02 | 2.85 |
|  | 3 | 2.5 | 2.5 | 20 | 2 | 14.04 | 2.85 |
|  | 4 | 2.5 | 2.5 | 20 | 3 | 21.05 | 2.85 |
|  | 5 | 2.5 | 2.5 | 20 | 4 | 28.07 | 2.85 |
| 40 | 6 | 2.5 | 2.5 | 20 | 0 | 0.00 | 2.4 |
|  | 7 | 2.5 | 2.5 | 20 | 1 | 8.33 | 2.4 |
|  | 8 | 2.5 | 2.5 | 20 | 2 | 16.67 | 2.4 |
|  | 9 | 2.5 | 2.5 | 20 | 3 | 25.00 | 2.4 |
|  | 10 | 2.5 | 2.5 | 20 | 4 | 33.33 | 2.4 |
| 25 | 11 | 2.5 | 2.5 | 20 | 0 | 0.00 | 1.8 |
|  | 12 | 2.5 | 2.5 | 20 | 1 | 11.11 | 1.8 |

TABLE 1-continued

| Thickness (μm) of Lower Cover Region (B) | Sample # | Thickness (μm) of Dielectric Layer C | Thickness (μm) of Electrode D | Thickness (μm) of External Electrode E | Numbers of Dummy Electrode N | Ratio (%) | $N < \dfrac{0.2*(B+E)}{(C+D)}$ |
|---|---|---|---|---|---|---|---|
| | 13 | 2.5 | 2.5 | 20 | 2 | 22.22 | 1.8 |
| | 14 | 2.5 | 2.5 | 20 | 3 | 33.33 | 1.8 |
| | 15 | 2.5 | 2.5 | 20 | 4 | 44.44 | 1.8 |

Referring to Table 1, as a result of comparing preferable numbers of dummy electrode 123 calculated using Equation 1 per each of the lower cover regions 113 having different thicknesses and actual numbers of stacked dummy electrode 123, it may be confirmed that samples in which the number of dummy electrode 123 did not satisfy a condition for N specified in Equation 1 were samples 4, 5, 9, 10, and 13 through 15, and the other samples (samples 1 to 3, 6 to 8, 11, and 12) satisfied that a ratio of the total thickness of the dummy electrodes 123 disposed in the lower cover region 113 to the sum of the thickness B of the lower cover region 113 and the thickness of the band portion 131b or 132b of the external electrode 131 or 132 disposed on the first surface 1 or bottom surface of the body 110 corresponding to the mounting surface of the body 110 was less than 20%.

The following Table 2 illustrates results obtained by performing electro magnetic (EM) simulations on the samples in Table 1.

TABLE 2

| Thickness (μm) of Lower Cover Region (B) | Sample # | SRF | Capacitance | ESL (pH) | ESR (mΩ) | ESL Increase Rate (%) Compared to No Dummy Electrode |
|---|---|---|---|---|---|---|
| 51.25 | 1 | 41.77 | 0.06 | 162.39 | 28.57 | 100.0 |
| | 2 | 41.17 | 0.06 | 170.76 | 26.45 | 105.2 |
| | 3 | 41.17 | 0.06 | 177.84 | 27.09 | 109.5 |
| | 4 | 41.17 | 0.06 | 182.48 | 27.08 | 112.4 |
| | 5 | 40.01 | 0.06 | 189.18 | 26.03 | 116.5 |
| 40 | 6 | 42.38 | 0.06 | 154.30 | 27.87 | 100.0 |
| | 7 | 41.77 | 0.06 | 163.68 | 27.57 | 106.1 |
| | 8 | 41.77 | 0.06 | 169.60 | 27.20 | 109.9 |
| | 9 | 41.77 | 0.06 | 175.03 | 27.10 | 113.4 |
| | 10 | 41.77 | 0.06 | 177.70 | 27.14 | 115.2 |
| 25 | 11 | 43.61 | 0.06 | 142.41 | 28.72 | 100.0 |
| | 12 | 42.99 | 0.06 | 153.01 | 27.57 | 107.4 |
| | 13 | 42.99 | 0.06 | 158.12 | 28.09 | 111.0 |
| | 14 | 42.38 | 0.06 | 161.53 | 27.23 | 113.4 |
| | 15 | 40.59 | 0.06 | 161.85 | 26.28 | 113.7 |

Referring to Table 2, it may be confirmed that as the number of dummy electrodes 123 was increased, the ESL tended to be increased.

That is, it may be appreciated that the standard for determining the number of dummy electrode 123 represented by Equation 1 described above was in relation to a degree of increase of ESL and an action of decreasing mechanical binding.

Referring to Table 2, it may be confirmed that in samples 2, 3, 7, 8, and 12 in which the ratio of the total thickness of the dummy electrodes 123 disposed in the lower cover region 113 to the sum of the thickness of the lower cover region 113 and the thickness of the external electrode 131 or 132 disposed on the mounting surface of the body 110 was less than 20% in Table 1, an increase rate of ESL was less than 10%.

Figure 9:
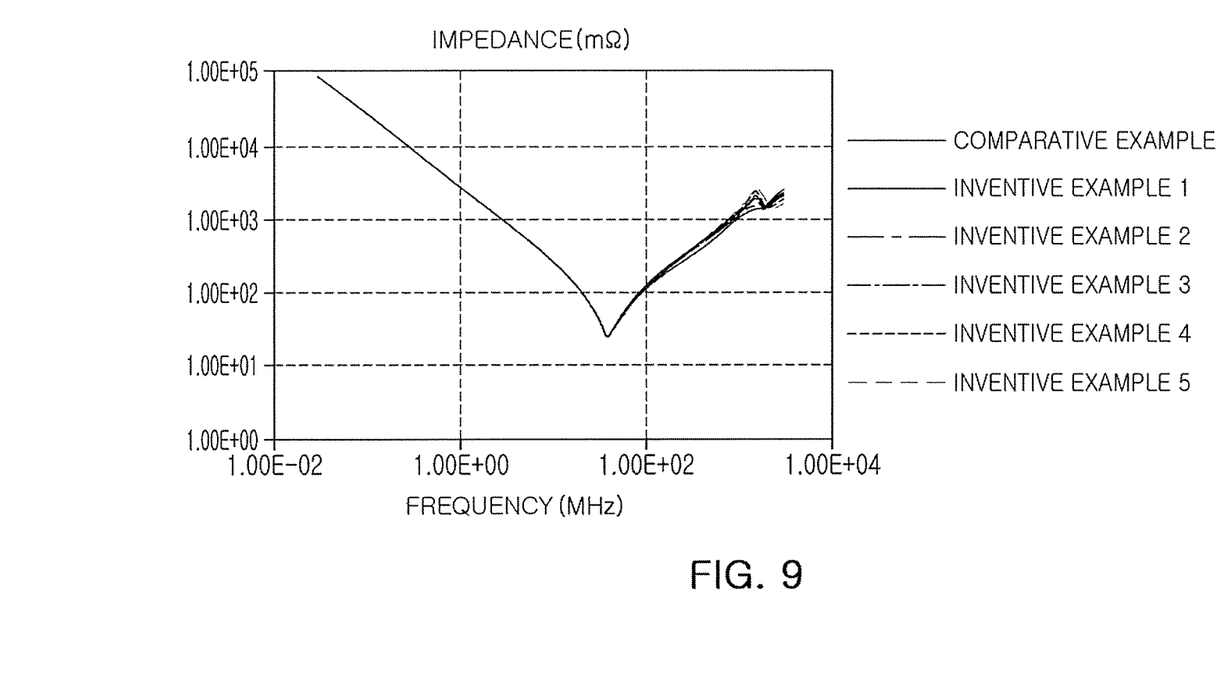
FIG. 9 is a graph illustrating a comparison result of impedances of multilayer capacitors depending on the number of stacked dummy electrodes.
Figure 10:
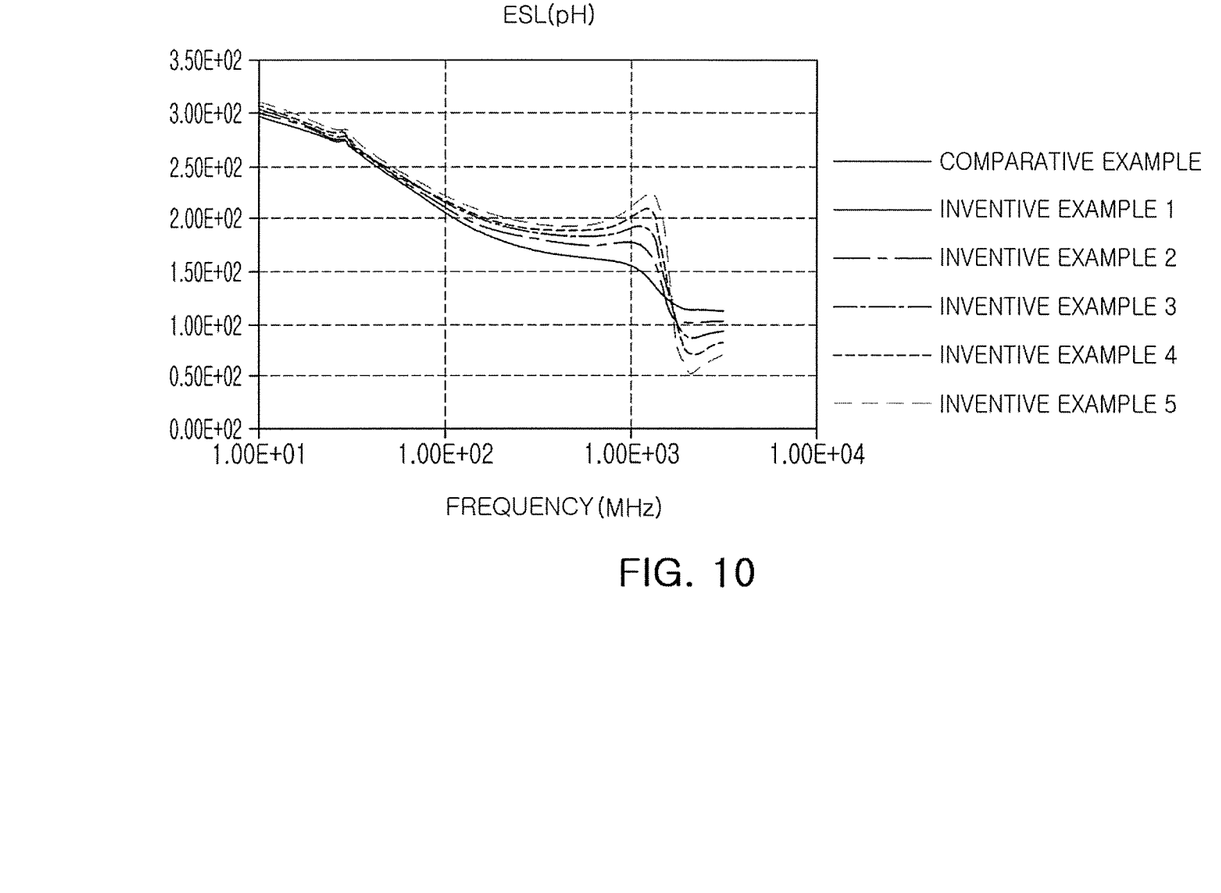
FIG. 10 is a graph illustrating a comparison result of equivalent series inductances (ESL) of multilayer capacitors depending on the number of stacked dummy electrodes.

FIG. 9 is a graph illustrating a comparison result of impedances of multilayer capacitors 100 depending on the number of stacked dummy electrodes 123, and FIG. 10 is a graph illustrating a comparison result of equivalent series inductances (ESL) of multilayer capacitors 100 depending on the number of stacked dummy electrodes 123.

Referring to FIGS. 9 and 10, capacitance was similarly observed regardless of the number of stacked dummy electrode 123, but ESL tended to be increased as the number of dummy electrode 123 was increased.

Figure 4:
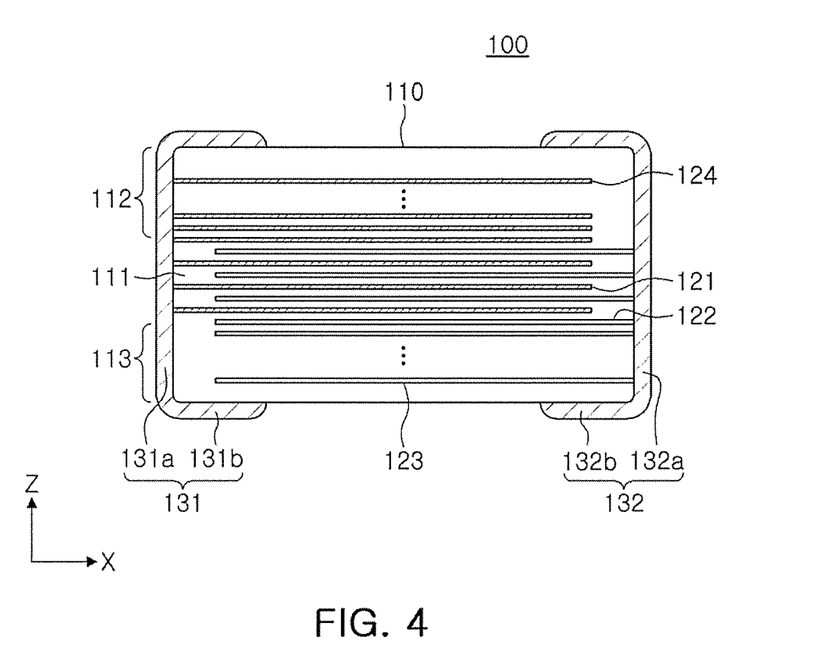
FIG. 4 is a cross-sectional view illustrating a multilayer capacitor 100 according to another exemplary embodiment in the present disclosure.

Referring to FIG. 4, a plurality of dummy electrode 124 may be further disposed in an upper cover region 112.

Here, a total thickness of the dummy electrodes 124 disposed in the upper cover region 112 may be less than 20% of a sum of a thickness of the upper cover region 112 and a thickness of a band portion 131b or 132b of an external electrode 131 or 132 disposed on the second surface 2 or top surface of the body 110, a surface of the body 110 opposing the mounting surface thereof.

In the present exemplary embodiment, the dummy electrode 124 may be an electrode disposed in the same direction as an internal electrode 121 or 122 disposed in an upper end of an active region 115, that is, a first internal electrodes 121 based on the accompanying drawings.

When the dummy electrode 124 is further disposed in the upper cover region 112 as described above, the multilayer capacitor 100 may have a symmetrical structure in a thickness or Z direction, such that directionality of the multilayer capacitor 100 in the thickness or Z direction, and mechanical strength of the body 110 may be further improved as compared to a case in which dummy electrodes 124 are present only in the lower cover region 113.

Figure 5:
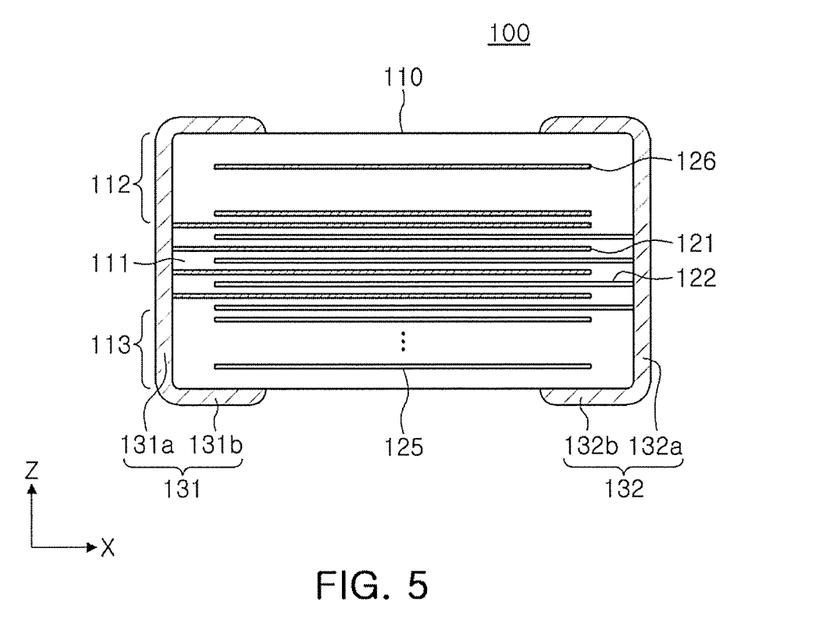
FIG. 5 is a cross-sectional view illustrating a multilayer capacitor 100 according to another exemplary embodiment in the present disclosure.
Figure 6:
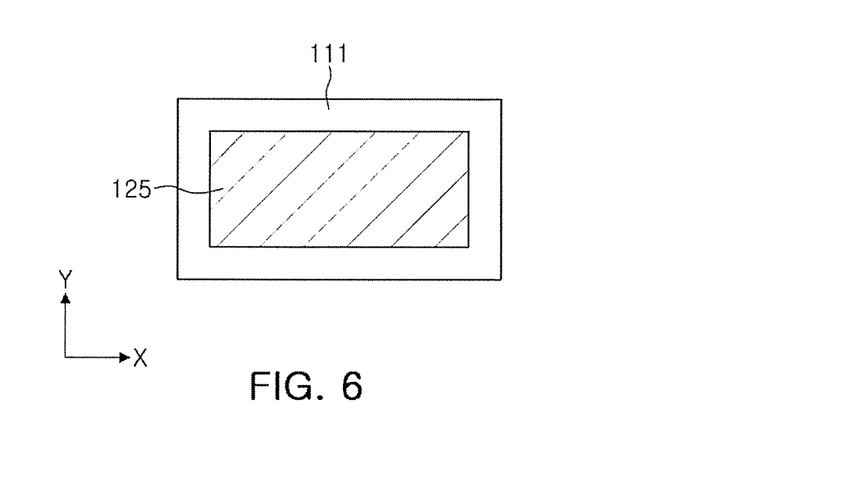
FIG. 6 is a plan view of the embodiment of FIG. 5 illustrating a floating electrode 125 of FIG. 5.

Referring to FIGS. 5 and 6, according to another exemplary embodiment in the present disclosure, a dummy electrode 125 may be a floating electrode not connected with the external electrodes 131 and 132.

Figure 7:
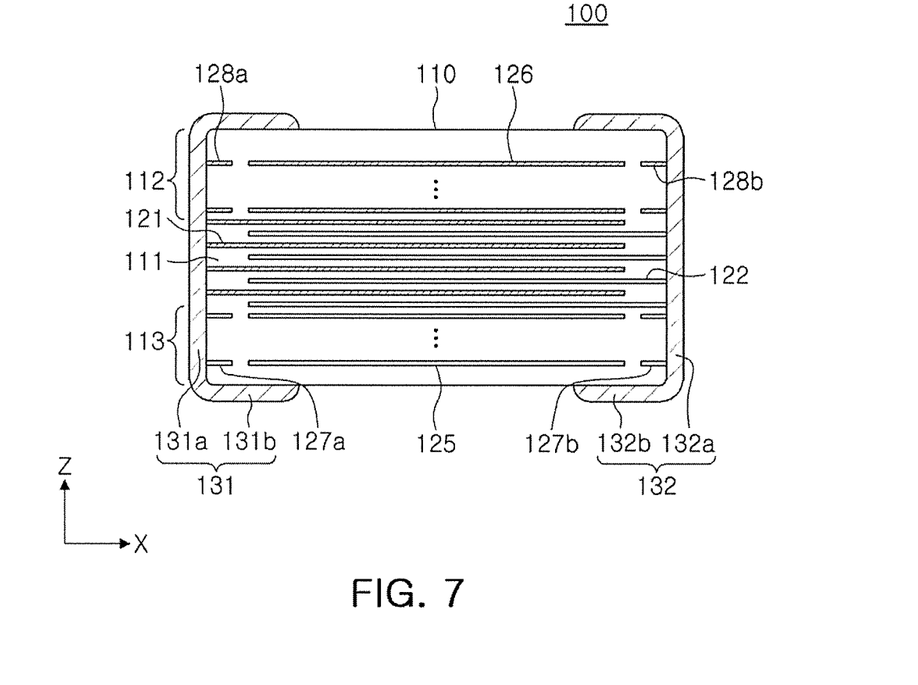
FIG. 7 is a cross-sectional view illustrating a multilayer capacitor 100 according to another exemplary embodiment in the present disclosure.
Figure 8:
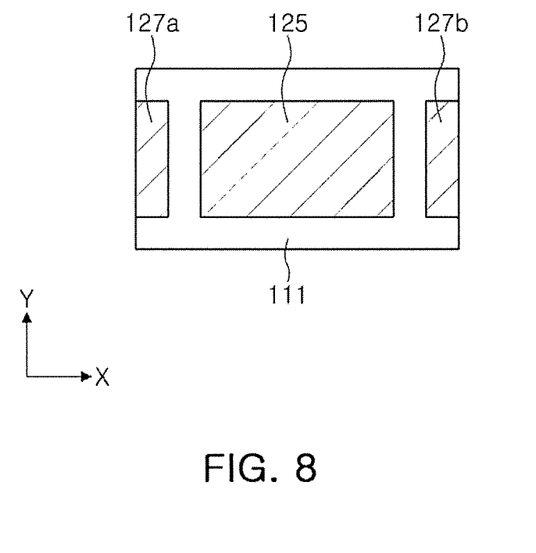
FIG. 8 is a plan view illustrating a dummy electrode 125 of FIG. 7.

Referring to FIGS. 7 and 8, according to another exemplary embodiment in the present disclosure, dummy electrodes may include a floating electrode 125 and first dummy patterns 127a and 128a and second dummy patterns 127b and 128b.

The first dummy patterns 127a and 128a and the second dummy patterns 127b and 128b may be formed to be symmetrical to each other in an X direction based on the floating electrode 125 and spaced apart from each other on dielectric layers 111 on which the floating electrode 125 is formed, and connected to the first and second external electrodes 131 and 132, respectively.

In this case, mechanical rigidity of an edge portion of a body 110 of which reliability is weak may be further improved.

As set forth above, according to exemplary embodiments in the present disclosure, a multilayer capacitor capable of significantly decreasing a degree of increase of ESL while securing mechanical rigidity at a predetermined level or more may be provided by allowing the multilayer capacitor to include the dummy electrode in the lower cover region, and controlling the total thickness of the dummy electrodes disposed in the lower cover region to be less than 20% of the sum of the thickness of the lower cover region and the thickness of the external electrode disposed on the mounting surface of the body.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a body including:
      an active region including:
         a plurality of dielectric layers; and
         a plurality of first and second internal electrodes alternately disposed with respective dielectric layers interposed therebetween; and
      upper and lower cover regions respectively disposed on upper and lower portions of the active region, first and second surfaces opposing each other, third and fourth surfaces connected to the first and second surfaces and opposing each other, and the first and second internal electrodes being exposed to the third and fourth surfaces of the body, respectively;
   first and second external electrodes disposed on the third and fourth surfaces of the body, respectively, and connected to the first and second internal electrodes, respectively; and
   at least one dummy electrode disposed in the lower cover region, the at least one dummy electrode having a first end adjacent to the third or fourth surface and a second end from which a corresponding dielectric layer extends to contact another one of the third or fourth surface,
   wherein a total thickness of the at least one dummy electrode disposed in the lower cover region is less than 20% of a sum of a thickness of the lower cover region and a thickness of one of the first and second external electrodes disposed on a mounting surface of the body.

2. The multilayer capacitor of claim 1, wherein the at least one dummy electrode includes an electrode disposed in a same direction as an internal electrode disposed in the lower portion of the active region.

3. The multilayer capacitor of claim 1, wherein the at least one dummy electrode includes a floating electrode.

4. The multilayer capacitor of claim 1, wherein the at least one dummy electrode includes a floating electrode and first and second dummy patterns spaced apart from each other on a dielectric layer on which the floating electrode is disposed and connected to the first and second external electrodes, respectively.

5. The multilayer capacitor of claim 1, further comprising at least one dummy electrode disposed in the upper cover region,
   wherein a total thickness of the at least one dummy electrode disposed in the upper cover region is less than 20% of a sum of a thickness of the upper cover region and a thickness of one of the first and second external electrodes disposed on a surface of the body opposing the mounting surface of the body.

6. The multilayer capacitor of claim 5, wherein the at least one dummy electrode includes an electrode disposed in a same direction as an internal electrode disposed in the upper portion of the active region.

7. The multilayer capacitor of claim 5, wherein the at least one dummy electrode includes a floating electrode.

8. The multilayer capacitor of claim 5, wherein the at least one dummy electrode includes a floating electrode and first and second dummy patterns spaced apart from each other on a dielectric layer on which the floating electrode is disposed and connected to the first and second external electrodes, respectively.

* * * * *